United States Patent
Hsu et al.

(10) Patent No.: US 9,942,852 B2
(45) Date of Patent: Apr. 10, 2018

(54) POWER SAVING BASED ON DISTRIBUTED ENHANCED MACHINE TYPE COMMUNICATIONS (EMTC) FUNCTIONS

(71) Applicant: QUALCOMM Incorporated, San Diego, CA (US)

(72) Inventors: Liangchi Hsu, San Diego, CA (US); Srinivasan Balasubramanian, San Diego, CA (US); Lijun Lin, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/399,688

(22) Filed: Jan. 5, 2017

(65) Prior Publication Data
US 2017/0201946 A1    Jul. 13, 2017

Related U.S. Application Data

(60) Provisional application No. 62/277,933, filed on Jan. 12, 2016.

(51) Int. Cl.
*H04W 52/02* (2009.01)
*G06F 1/32* (2006.01)
*H04W 88/02* (2009.01)

(52) U.S. Cl.
CPC ...... *H04W 52/0258* (2013.01); *G06F 1/3287* (2013.01); *H04W 52/028* (2013.01); *H04W 88/02* (2013.01)

(58) Field of Classification Search
CPC ......... H04W 28/0221; H04W 52/0235; H04W 52/0258; H04W 52/0274; H04W 88/02; H04W 52/02; H04W 52/0293; H04W 52/00; H04W 52/0261

USPC .... 455/574, 572, 550.1, 575.1, 343.1–343.6, 455/422.1, 403, 557, 556.1, 556.2; 1/1; 370/310, 311

See application file for complete search history.

(56) References Cited

U.S. PATENT DOCUMENTS

2006/0146769 A1    7/2006  Patel et al.
2007/0109987 A1    5/2007  Kohlmann et al.
(Continued)

OTHER PUBLICATIONS

International Search Report and Written Opinion—PCT/US2017/012550—ISA/EPO—dated Mar. 31, 2017.

*Primary Examiner* — Keith Ferguson
(74) *Attorney, Agent, or Firm* — Patterson & Sheridan, LLP

(57) ABSTRACT

Certain aspects of the present disclosure generally relate to wireless communications and, more specifically, to power savings based on distributed enhanced machine type communication (eMTC) functions, for example, between an applications processor and a modem of an eMTC device. An example method generally includes entering a power saving mode (PSM), wherein entering the PSM includes performing a first power collapse of an applications processor of the wireless node and a modem of the wireless node into a low power state; exiting the PSM at expiry of a wake-up timer, wherein exiting the PSM includes waking up the applications processor and the modem from the low power state to an active power state; and in response to exiting the PSM, performing a second power collapse of the applications processor into the low power state while the modem operates in the active power state.

30 Claims, 11 Drawing Sheets

(56) References Cited

U.S. PATENT DOCUMENTS

| | | |
|---|---|---|
| 2007/0127403 A1 | 6/2007 | Lu et al. |
| 2010/0313050 A1* | 12/2010 | Harrat .................. G06F 1/3203 713/323 |
| 2013/0238915 A1 | 9/2013 | Kashikar |
| 2014/0321302 A1 | 10/2014 | Fan et al. |
| 2015/0121100 A1 | 4/2015 | Peng et al. |

* cited by examiner

POWER SAVING BASED ON DISTRIBUTED ENHANCED MACHINE TYPE COMMUNICATIONS (EMTC) FUNCTIONS

CROSS-REFERENCE TO RELATED APPLICATION & PRIORITY CLAIM

This application claims benefit of and priority to U.S. Provisional Patent Application Ser. No. 62/277,933, filed Jan. 12, 2016, which is herein incorporated by reference in its entirety for all applicable purposes.

BACKGROUND

Field of the Disclosure

Certain aspects of the present disclosure generally relate to wireless communications and, more specifically, to power savings based on distributed enhanced/evolved machine type communication(s) (eMTC) functions, for example, between an application(s) processor and a modem of an eMTC device.

Description of the Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

In some examples, a next generation network, such as NR or 5G networks, a may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit).

Some next generation, NR, or 5G networks may support an uplink-based medium access control (MAC) layer. In these networks, a UE may transmit a pilot signal (e.g., a reference signal) for network access devices (e.g., distributed units) to receive and measure. Based on measurements of the pilot signal by one or more network access devices, the network may identify a serving cell (or serving distributed unit) for the UE. As the UE moves within the network, the network may make at least some mobility decisions for the UE (e.g., decisions to initiate a handover of the UE from one serving cell to another serving cell) transparently to the UE (e.g., without notifying the UE of the mobility decision, or without involving the UE in the mobility decision).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network. As used herein, application processor and applications processor are generally referred to as applications processor.

Techniques and apparatus are provided herein for enhancing power saving mode (PSM) procedures in machine type communications (MTC) and/or enhanced/evolved MTC (eMTC). Certain aspects of present disclose relate to power savings based on distributed eMTC functions, for example, between an applications processor and a modem of an eMTC device.

Certain aspects of the present disclosure provide a method for wireless communications by a wireless node. The method generally includes entering a PSM, wherein entering the PSM includes performing a first power collapse of an applications processor of the wireless node and a modem of the wireless node into a low power state; exiting the PSM at expiry of a wake-up timer, wherein exiting the PSM includes waking up the applications processor and the modem from the low power state to an active power state; and in response to exiting the PSM, performing a second power collapse of the applications processor into the low power state while the modem operates in the active power state.

Certain aspects of the present disclosure provide an apparatus for wireless communications. The apparatus generally includes means for entering a PSM, wherein means for entering the PSM includes means for performing a first power collapse of an applications processor of the apparatus and a modem of the apparatus into a low power state; means for exiting the PSM at expiry of a wake-up timer, wherein means for exiting the PSM includes means for waking up the applications processor and the modem from the low power state to an active power state; and means for, in response to exiting the PSM, performing a second power collapse of the applications processor into the low power state while the modem operates in the active power state.

Certain aspects of the present disclosure provide an apparatus for wireless communications. The apparatus generally includes at least one processor configured to enter a PSM, wherein entering the PSM includes performing a first power collapse of an applications processor of the apparatus and a modem of the apparatus into a low power state; exit the PSM at expiry of a wake-up timer, wherein exiting the PSM includes waking up the applications processor and the modem from the low power state to an active power state; and in response to exiting the PSM, performing a second power collapse of the applications processor into the low power state while the modem operates in the active power state; and a memory coupled to the at least one processor.

Certain aspects of the present disclosure provide a computer readable medium having computer executable code stored thereon for wireless communications by a wireless node. The code generally includes code for entering a PSM, wherein code for entering the PSM includes code for performing a first collapse of an applications processor of the wireless node and a modem of the wireless node into a low power state; code for exiting the PSM at expiry of a wake-up timer, wherein code for exiting the PSM includes code for waking up the applications processor and the modem from the low power state to an active power state; and code for, in response to exiting the PSM, performing a second power collapse of the applications processor into the low power state while the modem operates in the active power state.

Numerous other aspects are provided including methods, apparatus, systems, computer program products, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
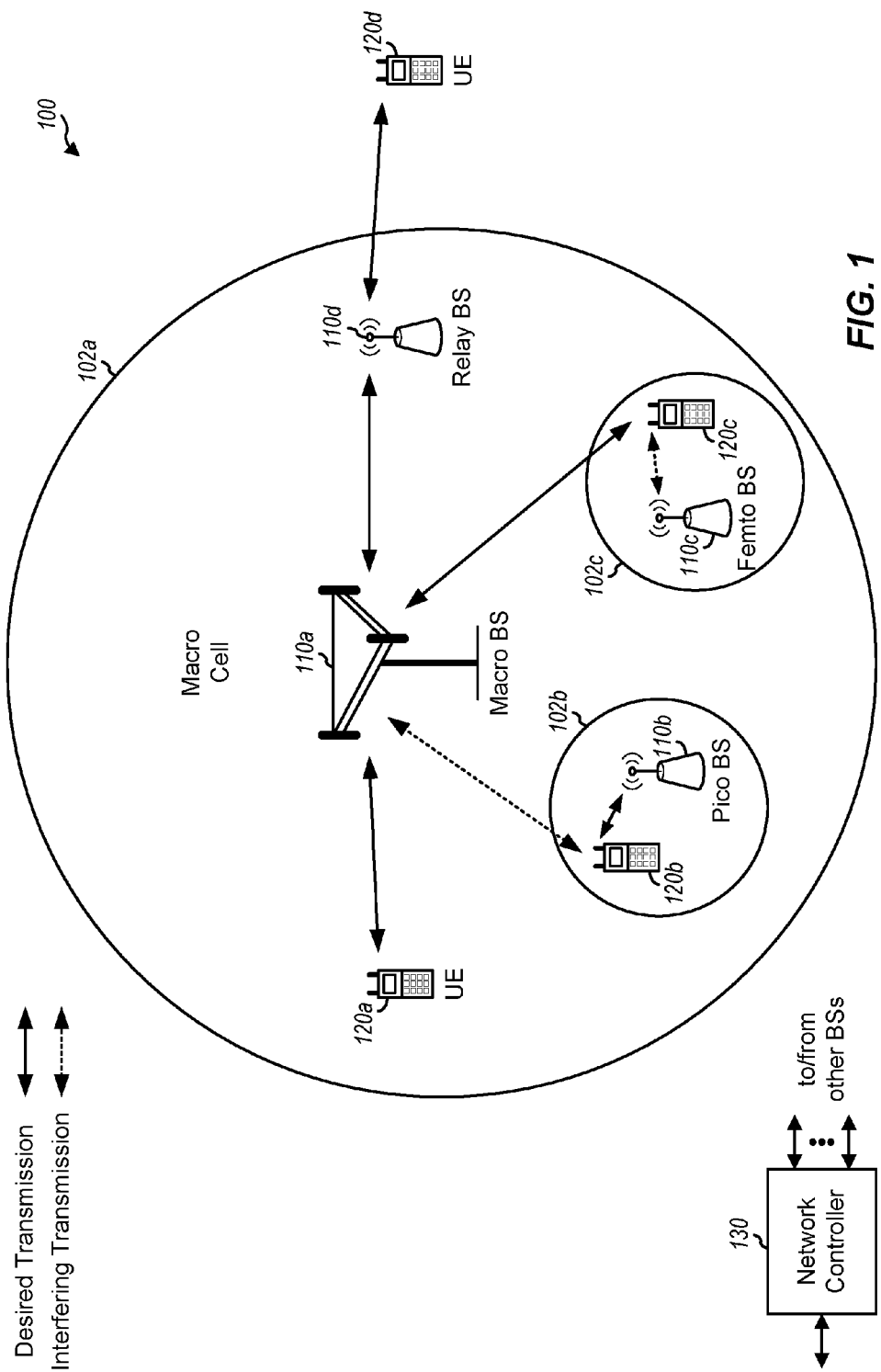
FIG. 1 illustrates an example multiple access wireless communication system, in accordance with certain aspects of the present disclosure.

Devices that operate in machine type communications (MTC) and/or enhanced/evolved MTC (eMTC) may be devices with limited communication resources, such as low cost MTC devices, low cost eMTC devices, low cost UEs, etc. The low cost MTC devices may co-exist with other legacy devices in a particular radio access technology (RAT) (e.g., long term evolution (LTE), etc.) and may operate on one or more narrowband regions partitioned out of an available system bandwidth that is supported by the particular operation, such as a coverage enhanced mode (e.g., where repetitions of the same message may be bundled or transmitted across multiple subframes), a normal coverage mode (e.g., where repetitions may not be transmitted), etc.

As will be described in more detail below, the techniques presented herein may allow for improved eMTC power saving mode (PSM) resulting in improved power savings. Low cost devices, such as eMTC devices, may support different modes of operation including modes for reducing the power consumption of a device. One example of a reduced power mode includes the PSM. In the PSM, the low cost device may enter a mode similar to power-off or power-down mode and may or may not remain registered or attached with a network. Distributed eMTC devices may decouple operations of the modem and applications processor in order to achieve improved eMTC PSM savings. Decoupling operations of the modem and the applications processor may allow the applications processor to be power collapsed, while the modem remains in an active state. For example, upon the low cost device exiting the PSM, the applications processor may enter the low power state (e.g., be power collapsed) while the modem attempts to connect to the network. As another example, after a connection to the network is established, the applications processor may enter the low power state after transferring applications data into a memory available to the modem.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE. NR is an emerging wireless communications technology under development in conjunction with the 5G Technology Forum (5GTF).

It is noted that while aspects may be described herein using terminology commonly associated with 3G and/or 4G wireless technologies, aspects of the present disclosure can be applied in other generation-based communication systems, such as NR technologies including 5G and later.

An Example Wireless Communications System

FIG. 1 illustrates an example wireless communication network 100 with base stations (BSs) and user equipments (UEs), in which aspects of the present disclosure may be practiced.

For example, an improved enhanced MTC (eMTC) power saving mode (PSM) may be provided for certain UEs 120 (e.g., low cost MTC UEs, low cost eMTC UEs, etc.) in wireless communication network 100 may be supported. According to the techniques presented herein, the UEs 120 may use distributed functions for the applications processor and modem of the UEs 120. Thus, the UEs 120 may be able to perform a power collapse of an applications processor (e.g., the applications processor may autonomously enter) into the low power state while operating the modem in an active power state. For example, the applications processor may be power collapsed into the low power state after exiting the PSM, while the modem attempts to connect to the network. The applications processor may also be power collapsed into to the low power state after transferring applications data to a memory available to the modem. It is understood that each of UEs 120 may include more than one applications processor and/or more than one modem and the techniques disclosed herein are applicable to such UEs.

Wireless communication network 100 may be a long term evolution (LTE) network, a new radio (NR) network, or some other wireless network. Wireless communication network 100 may include a number of BSs 110 and other network entities. A BS is an entity that communicates with UEs. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "BS", "eNB", "NB", "5G NB", "NR BS", "gNB", "transmission reception point" (TRP), "access point" (AP), and "cell" may be used interchangeably herein.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay (station) BS 110d may communicate with macro BS 110a and a UE 120d in order to facilitate communication between BS 110a and UE 120d. A relay station may also be referred to as a relay BS, a relay base station, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 W) whereas pico BSs, femto BSs, and relay BSs may have lower transmit power levels (e.g., 0.1 to 2 W).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a robot, a drone, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a position location device (e.g., satellite such as GPS or Beidou, terrestrial, etc.), or any other suitable device that is configured to communicate via a wireless or wired medium.

Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Low cost UEs may co-exist with legacy and/or advanced UEs in the wireless communication network 100 and may have one or more capabilities that are limited when compared to the other UEs (e.g., non-low cost UEs) in the wireless communication network 100. For example, when compared to legacy and/or advanced UEs in the wireless communication network 100, the low cost UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc.

Aspects, of the present disclosure provide apparatus, methods, processing systems, and computer program products for new radio (NR) (new radio access technology or 5G technology).

NR may support various wireless communication services, such as Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra reliable low latency communications (URLLC).

Figure 2:
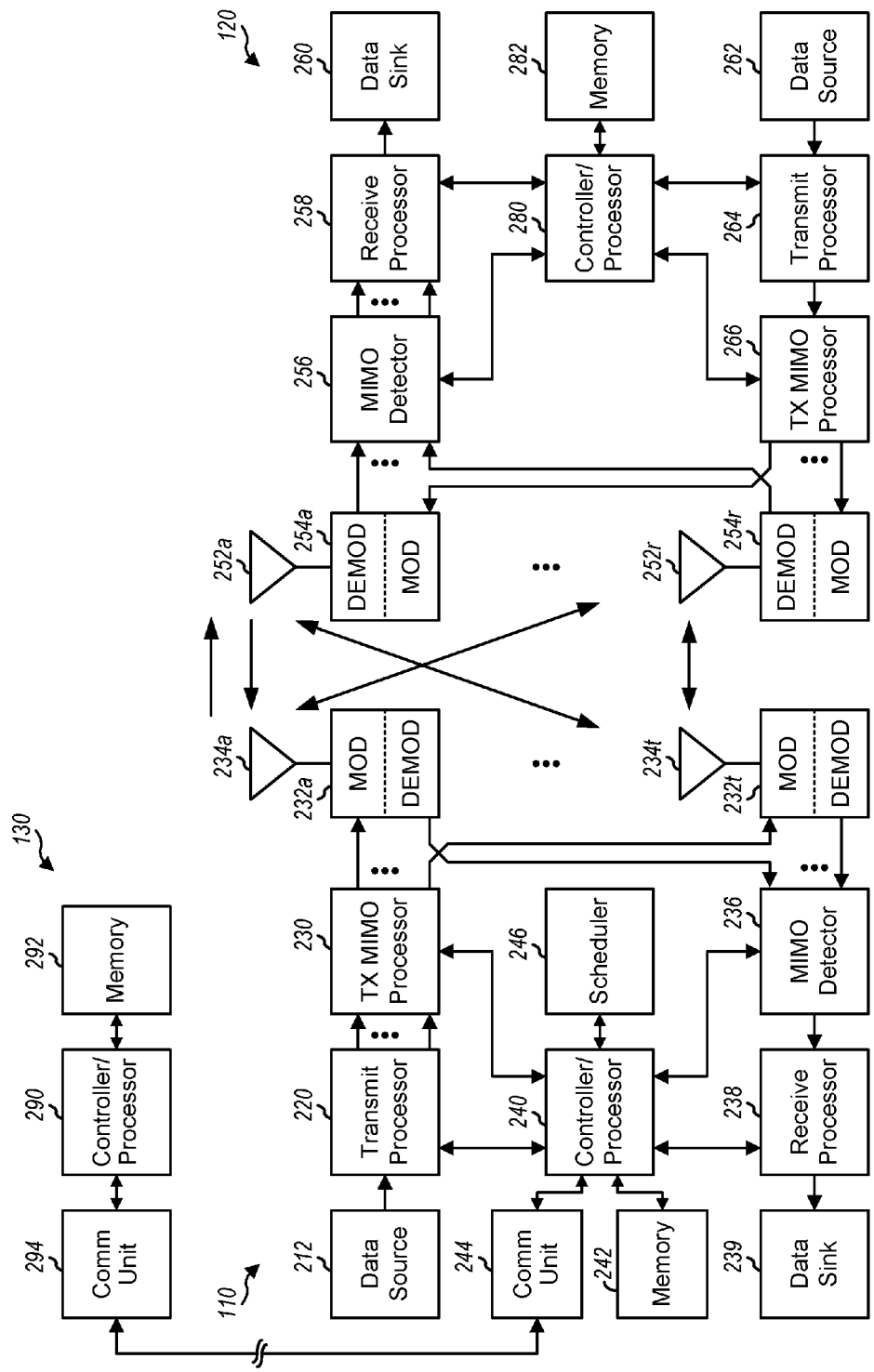
FIG. 2 illustrates a block diagram of a base station and a wireless node, in accordance with certain aspects of the present disclosure.

FIG. 2 is a block diagram of a design of BS 110 and UE 120, which may be one of the BSs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations and/or processes for the techniques described herein. Similarly, controller/processor 280 and/or other processors and modules at UE 120 may perform or direct operations 900 illustrated in FIG. 9 and/or other processes for the techniques described herein. Memories 242 and 282 may store data and program codes for BS 110 and UE 120, respectively. A scheduler 246 may schedule UEs for data transmission on the downlink and/or uplink.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 3:
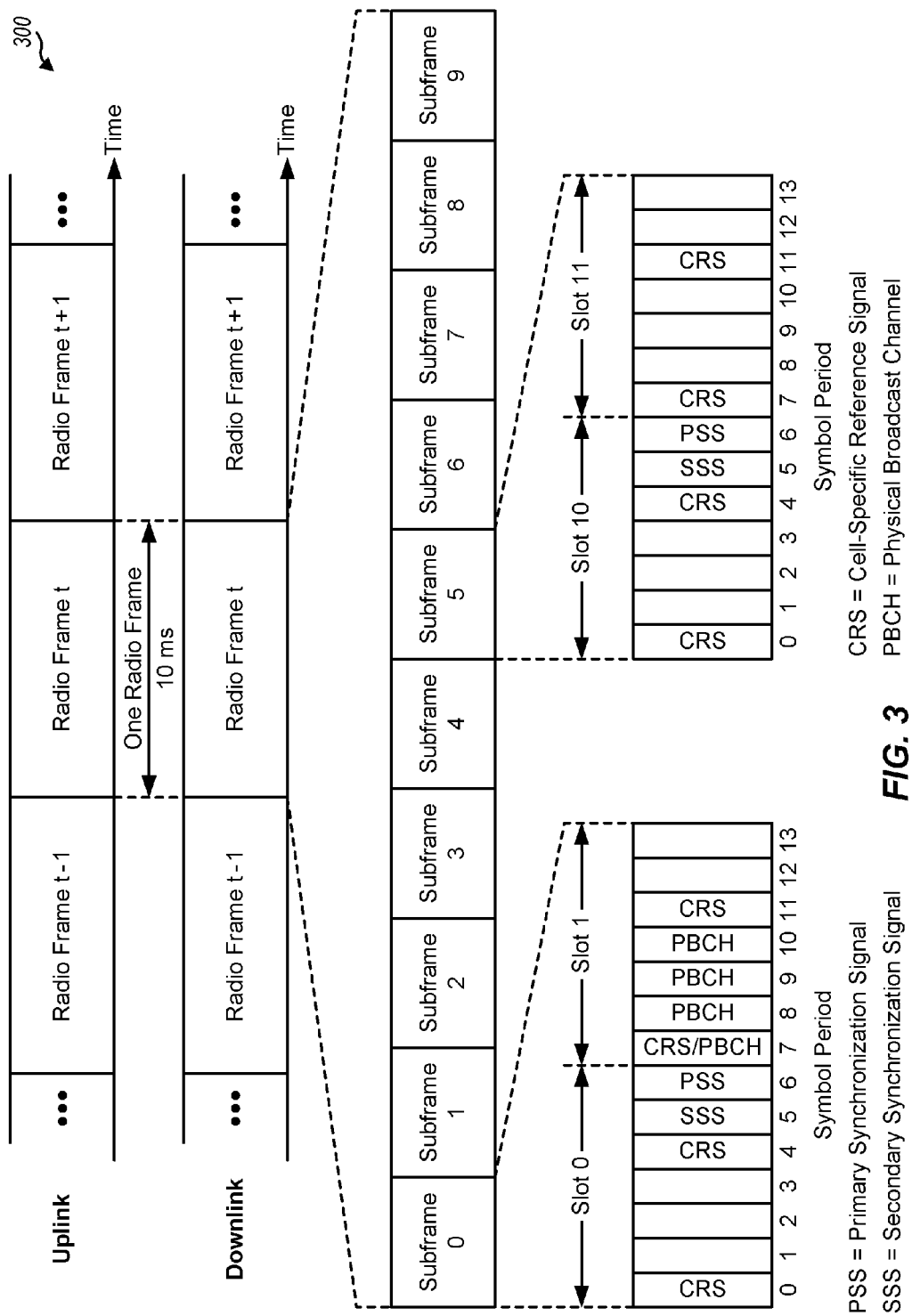
FIG. 3 shows an exemplary frame structure for FDD in a wireless communication system, in accordance with certain aspects of the present disclosure.

FIG. 3 shows an exemplary frame structure 300 for FDD in a wireless communication system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In some wireless communication systems (e.g., LTE), a BS may transmit a primary synchronization signal (PSS) and a secondary synchronization signal (SSS) on the downlink in the center 1.08 MHz of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

In certain systems (e.g., such as NR or 5G systems), a BS may transmit these or other signals in these locations or in different locations of the subframe.

Figure 4:
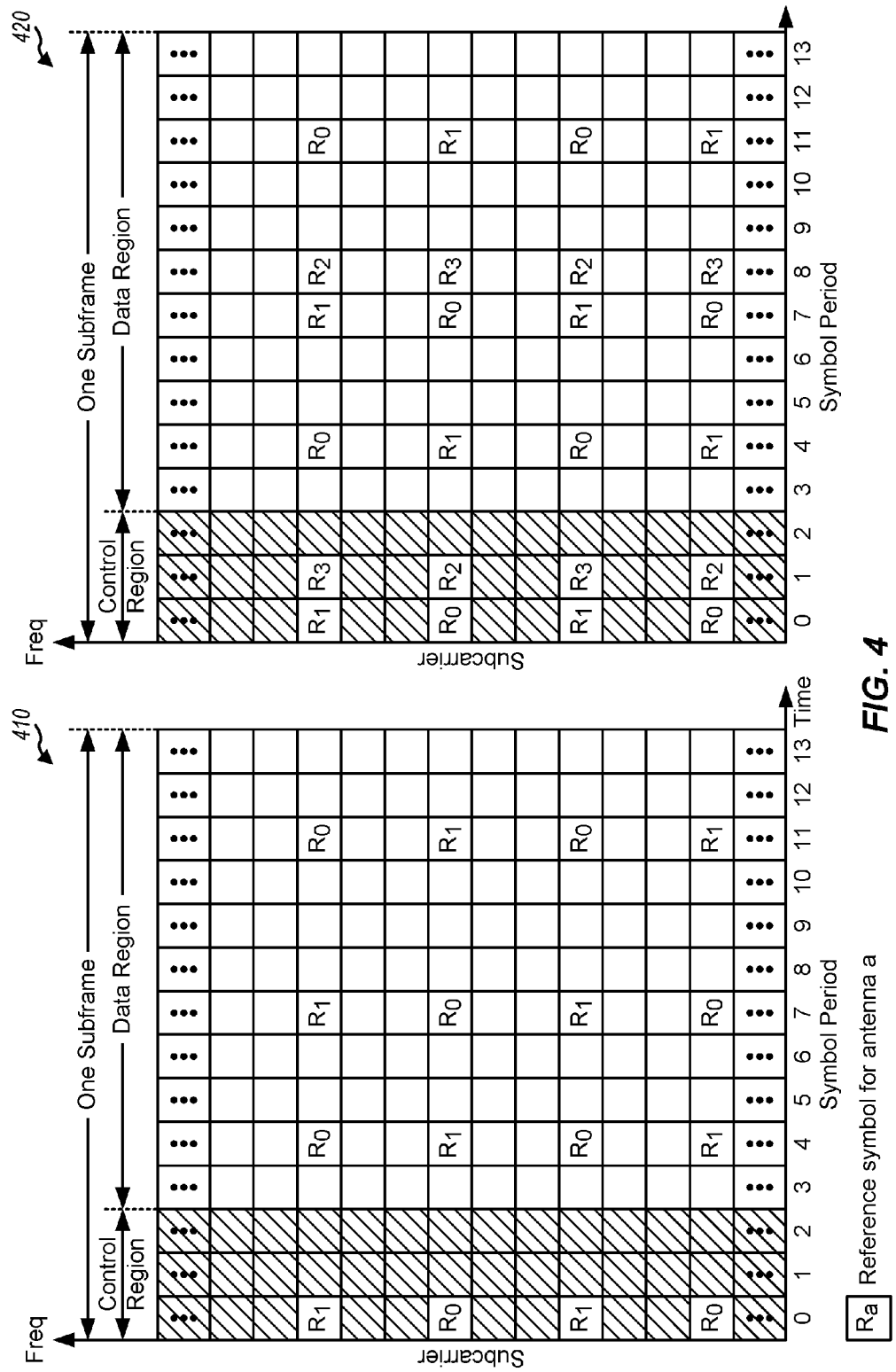
FIG. 4 shows two example subframe formats for a downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for a BS equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for a BS equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different BSs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

In certain systems (e.g., such as NR or 5G systems), a BS may transmit these or other signals in these locations or in different locations of the subframe.

A UE may be located within the coverage of multiple BSs. One of these BSs may be selected to serve the UE. The serving BS may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

As mentioned above, one or more UEs in the wireless communication network (e.g., wireless communication network 100) may be devices that have limited communication resources, such as low cost UEs, as compared to other (non-low cost) devices in the wireless communication network.

Example Low Cost MTC

In some systems (e.g., LTE Rel-13, NR, and/or 5G), a low cost UE may be limited to a particular narrowband assignment (e.g., of no more than six resource blocks (RBs)) within the available system bandwidth. However, the low cost UE may be able to re-tune (e.g., to operate and/or camp) to different narrowband regions within the available system bandwidth of the LTE system, for example, in order to co-exist within the LTE system.

As another example of coexistence within the LTE system, low cost UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the low cost UE may be able to receive the legacy PBCH with one or more additional repetitions of the PBCH across multiple subframes (e.g., bundled). As another example, the low cost UE may be able to transmit one or more repetitions of PRACH (e.g., with one or more PRACH formats supported) to a BS (e.g., BS 10) in the LTE system. The PRACH can be used to identify the low cost UE. Also, the number of repeated PRACH attempts can be configured by the BS.

The low cost UE may also be a link budget limited device and may operate in different modes of operation (e.g., using different numbers of repetitions for messages transmitted to or from the low cost UE) based on its link budget limitation. For example, in some cases, the low cost UE may operate in a normal coverage mode in which there is little to no repetition (e.g., the amount of repetition needed for the UE to successfully receive and/or transmit a message may be low or repetition may not even be needed). Alternatively, in some cases, the low cost UE may operate in a coverage enhancement (CE) mode in which there may be high amounts of repetition. For example, for a 328 bit payload, a low cost UE in CE mode may need 150 or more repetitions of the payload in order to successfully transmit and/or receive the payload.

In some cases (e.g., for LTE Rel-13), the low cost UE may have limited capabilities with respect to its reception of broadcast and unicast transmissions. For example, the maximum transport block (TB) size for a broadcast transmission received by the low cost UE may be limited to 1000 bits. Additionally, in some cases, the low cost UE may not be able to receive more than one unicast TB in a subframe. In some cases (e.g., for both the CE mode and normal mode described above), the low cost UE may not be able to receive more than one broadcast TB in a subframe. Further, in some cases, the low cost UE may not be able to receive both a unicast TB and a broadcast TB in a subframe.

Example MTC Coexistence within a Wideband System

Figure 5:
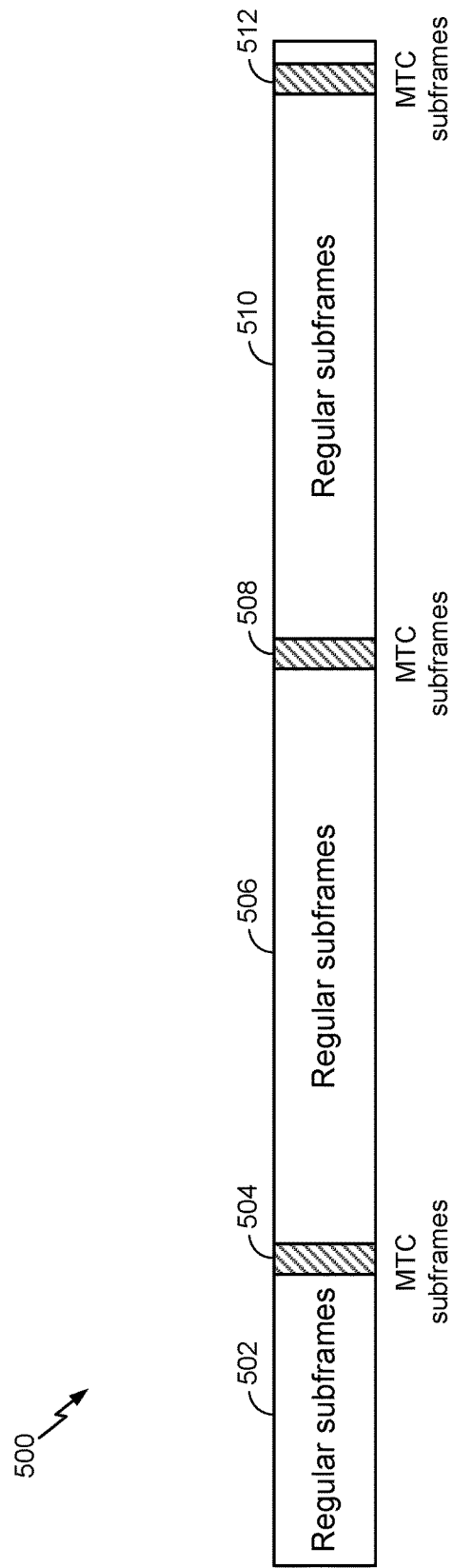
FIGS. 5 and 5A illustrate example frame structures, in accordance with certain aspects of the present disclosure.
Figure 5A:
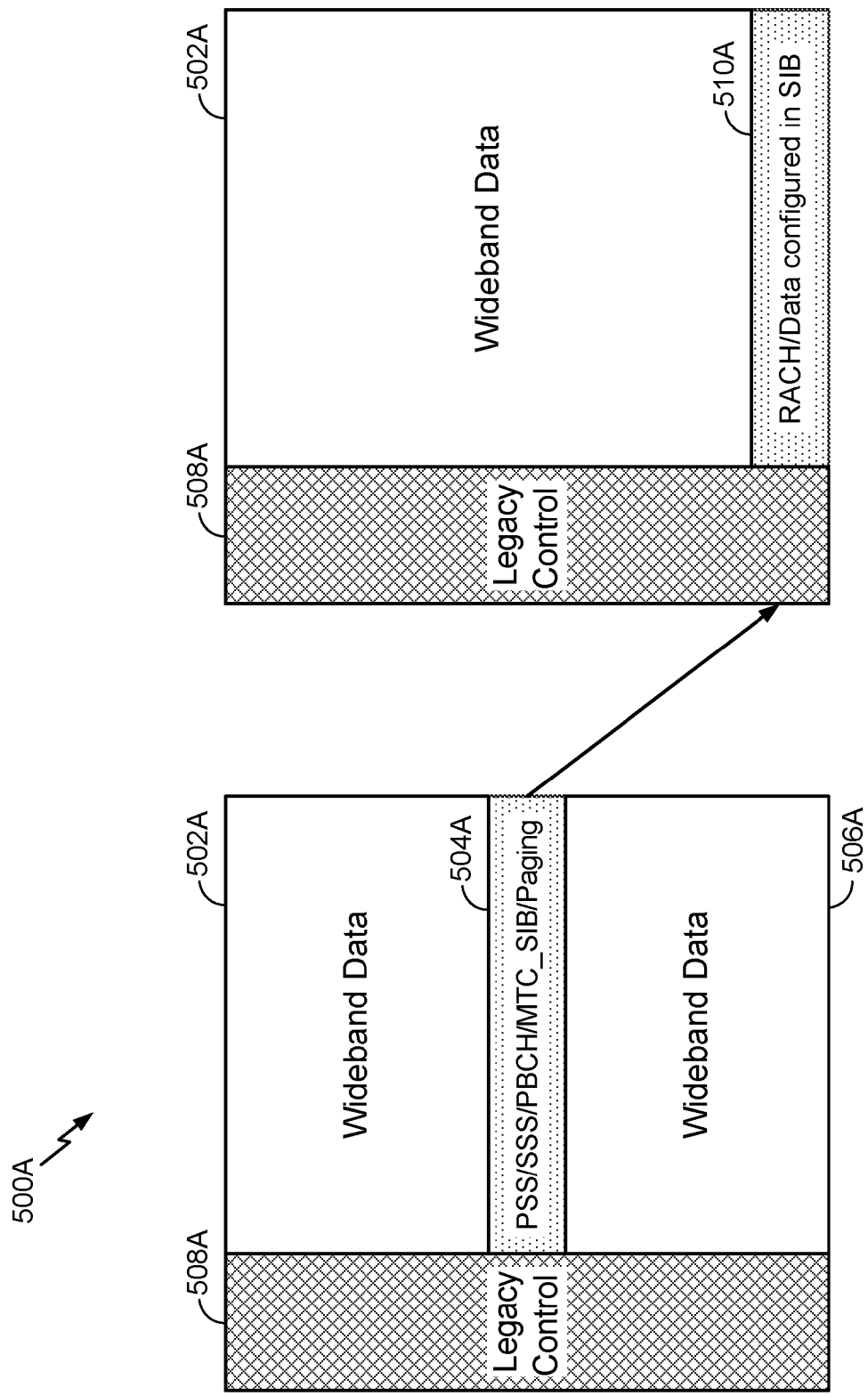

As mentioned above, MTC and/or eMTC operation may be supported (e.g., in coexistence with LTE or some other RAT) in the wireless communication network (e.g., wireless communication network 100). FIGS. 5 and 5A illustrate an example of how low cost UEs in MTC operation may co-exist within a wideband system, such as LTE.

As illustrated in the example frame structure 500 of FIG. 5, subframes associated with MTC and/or eMTC operation may be time division multiplexed (TDM) with regular subframes associated with LTE (or some other RAT). For example, regular subframe may occur at time instances 502, 506, and 510 can be TDM with MTC subframes occurring at time instances 504, 508, and 512. As shown in FIG. 5, in one example implementation, the number of subframe associated with (e)MTC operation may be relatively small compared to the number of regular subframes.

Additionally or alternatively, as illustrated in the example frame structure 500A of FIG. 5A, one or more narrowbands used by low cost UEs in MTC may be frequency division multiplexed (FDM) within the wider bandwidth supported by LTE. Multiple narrowband regions may be supported for MTC and/or eMTC operation, with each narrowband region spanning a bandwidth that is no greater than a total of 6 RBs. In some cases, each low cost UE in MTC operation may operate within one narrowband region (e.g., at 1.4 MHz or 6 RBs) at a time. However, low cost UEs in MTC operation, at any given time, may re-tune to other narrowband regions in the wider system bandwidth. In some examples, multiple low cost UEs may be served by the same narrowband region. In other examples, multiple low cost UEs may be served by different narrowband regions (e.g., with each narrowband region spanning 6 RBs). In yet other examples, different combinations of low cost UEs may be served by one or more same narrowband regions and/or one or more different narrowband regions.

As shown in FIG. 5A, in a subframe 500A, the low cost UE can monitor a wideband region 508A for legacy control information and wideband regions 502A and 506A for data. The low cost UEs may operate (e.g., monitor/receive/transmit) within the narrowband regions for various different operations. For example, as shown in FIG. 5A, a first narrowband region 504A (e.g., spanning no more than 6 RBs) of a subframe may be monitored by one or more low cost UEs for either a primary synchronization signal (PSS), a secondary synchronization signal (SSS), a physical broadcast channel (PBCH), MTC signaling, or paging transmission from a BS in the wireless communication network. As also shown in FIG. 5A, the low cost UE can retune to a second narrowband region 510A (e.g., also spanning no more than 6 RBs of the wideband data) of a subframe to transmit a RACH or data previously configured in signaling received from a BS. In some cases, the second narrowband region 510A may be utilized by the same low cost UEs that utilized the first narrowband region 504A (e.g., the low cost UEs may have re-tuned to the second narrowband region to transmit after monitoring in the first narrowband region). In some cases (although not shown), the second narrowband region 510A may be utilized by different low cost UEs than the low cost UEs that utilized the first narrowband region 504A.

Although the examples described herein assume a narrowband of 6 RBS, those skilled in the art will recognize that the techniques presented herein may also be applied to different sizes of narrowband regions.

Example Power Savings Mode Architecture

For certain low cost devices, such as enhanced machine type communication (eMTC) devices, the Power Saving Mode (PSM) is a mode of operation to reduce power consumption and save battery life, for example. Due to the nature of eMTC applications, such as being infrequently active, having a short duration of active communication, etc., the objective of PSM is to allow the low cost device to enter an "inactive" or "power-down" state, for example, for a prolonged duration and to "wake up" only for a brief time for the low cost device to be "connected" with the mobile network or with the applications server (e.g., eMTC server) in order to perform data transmissions, data reception, and/or network configurations. The data transmission may be originated by the low cost device (e.g., uplink transmission), but it is also possible to engage in downlink transmission during the "active" duration.

Figure 6:
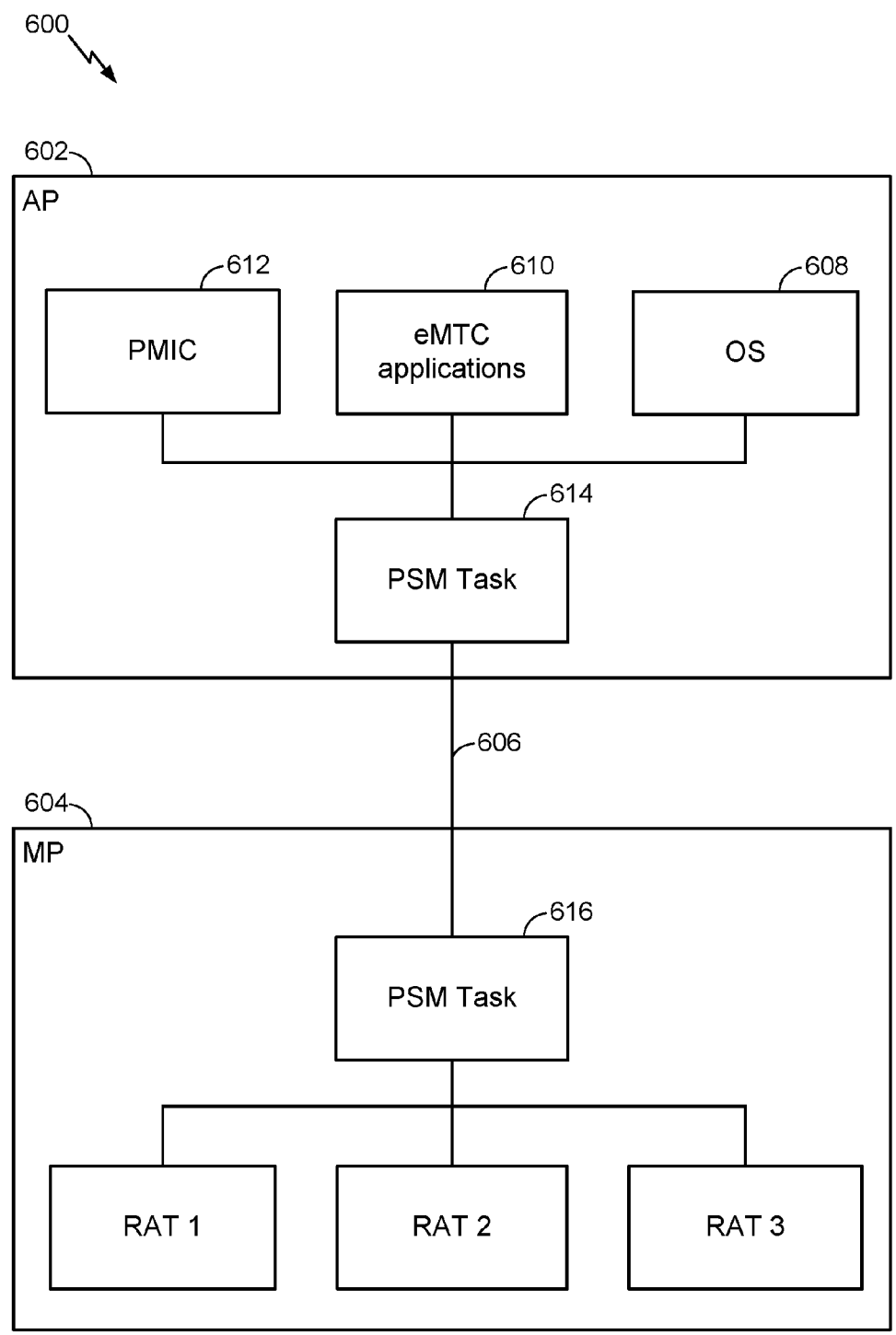
FIG. 6 illustrates a processing system that may be utilized for power management, in accordance with certain aspects of the present disclosure.

FIG. 6 illustrates a processing system 600 that may be utilized for power management, according to certain aspects. Processing system 600 is an example component of a wireless device (e.g., a low cost device) that may be configured to implement the various methods described herein. The wireless device may be any of the wireless nodes (e.g., UEs 120a, 120b, 120c). For example, the wireless device may be configured to perform operations 900 described in FIG. 9.

The processing system 600 may include an applications processor (AP) 602 and a modem processor (MP) 604 (also referred to as a modem). In this example, MP 604 is attached to AP 602 and communicates with AP 602 via an interface 606. In other aspects, the modem chipset may include some or all of the functionality of the AP or vice versa, or the functionality of the AP and MP may be divided across any number of additional processors.

AP 602 may execute functional entities (e.g., implementations) of protocol layers. For example, the AP 602 may be configured to execute an operating system and file system 608 for managing resources, storage, and facilitating the execution of eMTC applications 610. Examples of eMTC applications 610 may include, but are not limited to, for example, a water or parking meter application. AP 602 may also include a power management hardware and controller (PMIC-power management integrated circuit) 612 for interfacing with power management hardware. Additionally, power saving mode (PSM) interface and control tasks 614 may be run by AP 602, for example, as a background task.

MP 604, for example, may be a multimode MP, capable of communicating with multiple radio access technologies (RATs) and controlling the associated radios. MP 604 may also run a PSM interface and control task, as well as tasks corresponding to RAT upper and lower layers.

Example Power Savings Mode Procedures

Generally, a PSM operation cycle may include multiple stages. The first stage may be the PSM deep-sleep stage. In this stage, the low cost device (e.g., a wireless node including the processing system 600 illustrated in FIG. 6) is in the "deep sleep mode", which is a very low power state. The low cost device is detached from the network. This stage may be of long duration (e.g., hours or days). The low power state during the long deep sleep mode may result in a long battery device for the eMTC device during this stage. For example, the power consumption during this stage may be on the order of sub-mA or lower.

The second stage may be a PSM Wake-up and Active stage. In this stage, the low cost device may wake up from the PSM deep sleep at a time scheduled prior to entering the deep sleep mode. During this stage, the low cost device can power up, attach to the network, obtain IP address, and perform "pre-scheduled" events per each eMTC application. During this stage, the low cost device may be in the "CONNECTED" state. This active stage may be of short duration (e.g., tens of seconds or shorter), compared with the duration of the first stage. The power consumption during this stage may be on the order of tens or hundreds of mA. Upon completion of the "pre-scheduled" events, eMTC applications may inform the PSM task of the "readiness to enter PSM mode". From this point on, the traffic channels may become "inactive", but the state may be still in CONNECTED, for example, at the radio resource control (RRC) and/or non-access stratum (NAS) layers. The PSM task may wait for the expiry of a so-called "Active Timer, Ta" in order to request the modem to enter the "PSM deep sleep" mode.

The third stage may be an IDLE stage. In this stage, the low cost device may enter the IDLE state due to the inactivity of the eMTC applications. The NAS ECM and RRC states may be in IDLE, while the low cost device is still attached with the network and may perform "Idle" tasks. The power consumption level during this stage may be one the order of a few mA. The duration of the IDLE stage may be short.

In the fourth stage, the low cost device may exit the IDLE stage and enter into an ACTIVE stage. The low cost device may initiate a "detach" procedure with the network. In the fifth stage, the low cost device may power down and re-enter the PSM deep sleep mode.

Figure 7:
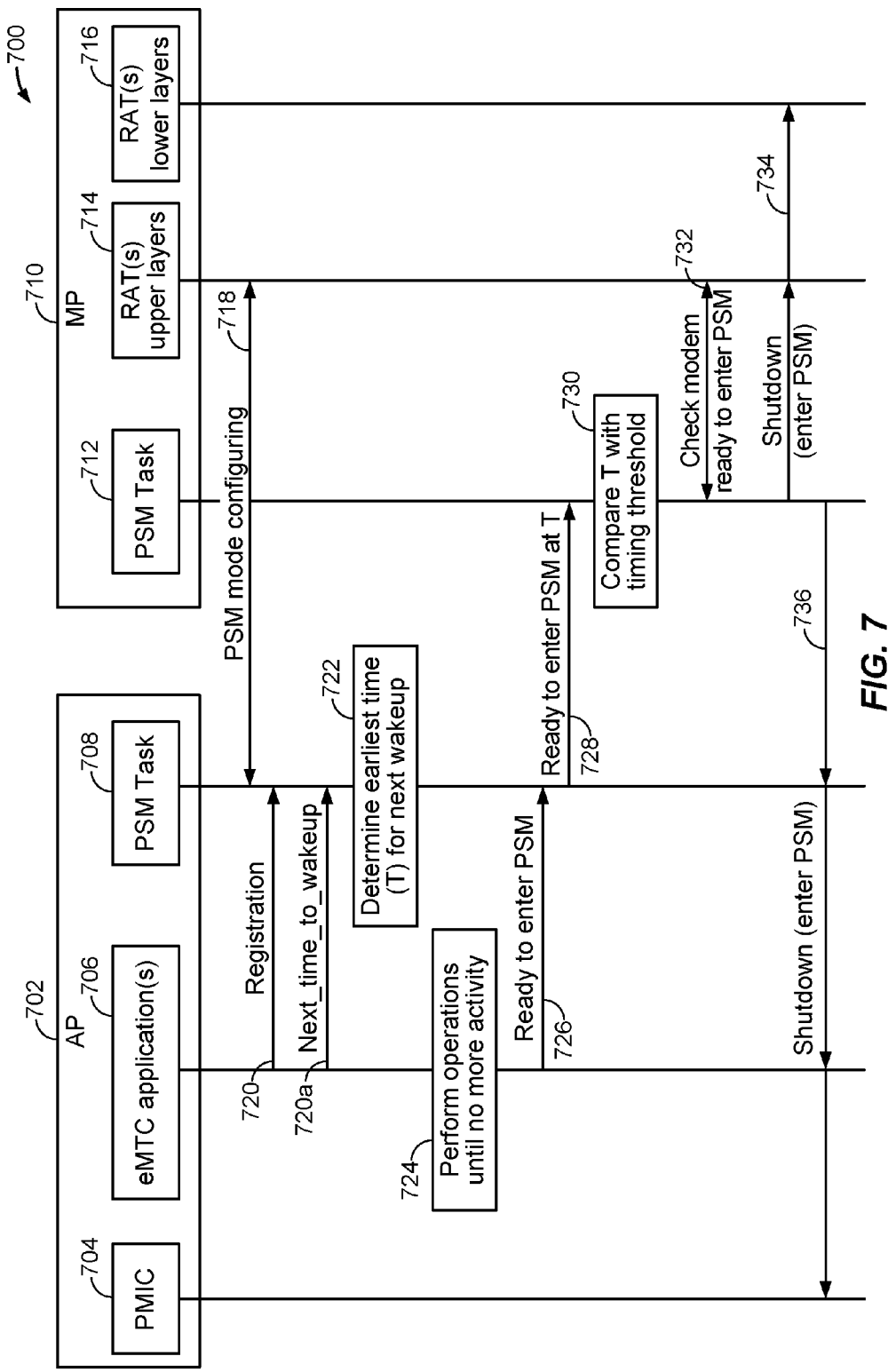
FIG. 7 is a call flow diagram illustrating an example power savings mode procedure, in accordance with certain aspects of the present disclosure.

FIG. 7 is a call flow diagram illustrating an example power savings mode procedure 700, in accordance with certain aspects of the present disclosure. Although not shown in FIG. 7, after the low cost device is powered on, either for the first time or from a previous PSM power down, the low cost device may perform a network attachment procedure with a radio access technology (RAT) and obtain one or more IP addresses from the RAT. The low cost device may perform any pre-scheduled events (e.g., uplink data transmission, etc.).

As shown in FIG. 7, AP 702 includes PMIC 704, eMTC application(s) 706, and PSM Task 708. MP 710 includes PSM Task 712, RAT upper layers 714, and RAT lower layers 716.

At 718, PSM Task 708 communicates with the RAT upper layers 714 for PSM mode configuring. For example, the PSM Task 708 and RAT upper layers 714 may exchange settings information such as, for example, supported PSM mode, PSM time threshold, and other supported PSM capabilities.

At 720, eMTC application(s) 706 register with the PSM Task 708. The registering can be performed via an application program interface (API). The registering indicates that eMTC application(s) 706 are PSM-aware.

Optionally, at 720a, eMTC application(s) 706 may also send a request to the PSM Task 708 for the next time to wake up (e.g., or a PSM duration), indicating a period of time, from the current time, after which the device should wake up to allow the AP 702 to perform operations. The AP 702 may be statically configured to request a particular PSM duration. Alternatively, the AP 702 may be configured to determine a particular PSM duration dynamically, for example, based on a determination made by the AP 702, or in conjunction with an eMTC server on the network. After waiting a reasonable PSM duration request period to collect application registrations and PSM durations, the PSM Task 708 may determine, at 722, the earliest PSM next wake up time (T) for the next wake-up based on the one or more PSM durations received.

At 724, the eMTC application(s) 706 may perform operations for the current wake-up cycle. For example, eMTC application(s) 706 may transmit and receive data with a server or a server may configure the application. Prior to entering a next PSM power down period, the application may determine the application's traffic activity, for example, whether the application is done performing operations for the current wake-up cycle. The AP 702 may also determine and store a requested next wake up time, a corresponding system time, or other information into the file system for determining the another wake up time in another wake-up cycle after the next PSM power down period. At 726, eMTC application(s) 706 application indicates, to PSM Task 708, that the particular eMTC application is ready to enter PSM power down period.

At 728, PSM Task 708 requests, to PSM Task 712, to enter the PSM power down period at a PSM entry time. The PSM entry time may be based on information derived from the determination made at 730 regarding the PSM next wake up time T. At 730, the PSM Task 712 determines whether T is a proper time to enter PSM power down period. This determination may be based, for example, on a comparison between T and the PSM time threshold, if so configured. This comparison, for example, may be used to avoid entering PSM power down period too early or at otherwise inopportune times, which may result in adverse power consumption.

At 732, PSM Task 712 checks modem conditions to determine whether MP 710 is ready to enter the PSM power down period. Modem 710 may indicate that entering PSM power down period is inappropriate if, for example, there is a circuit switched or emergency call registered with the network. At 734, after a determination that entering the PSM power down period is appropriate, PSM Task 712 indicates to the modem to enter the PSM power down period. Prior to entering the PSM power down period, the modem may perform a detach procedure with the network. At 736, AP 702 also enters the PSM power down period. The device then enters the PSM power down period until the PSM next wake up time T requested at 712. While in PSM power down period, the device may not be reachable by the network as the device may be detached from the network.

According to certain aspects, the determination of the next wake up time (e.g., at 722) can be based on the minimum requested PSM duration. During a first wake-up cycle, an AP (e.g., such as AP 602 or AP 702) may receive a PSM duration from one or more (eMTC) applications. For example, a first application, App1, may request a first PSM duration (t1) of 8 hours, a second application, App2, may request a second PSM duration (t2) of 5 hours, and a third application, App3, may request a third PSM duration (t3) of 17 hours. The AP PSM Task (e.g., such as PSM Task 708) may then determine the minimum of the three requested PSM durations and set a PSM next wake up time T (or PSM duration) to the determined minimum time, in this example, 5 hours.

After time T passes, AP 702 may wake-up for a second wake-up cycle. AP 702 may again receive PSM durations from eMTC applications 706. Here, App2 may be configured with a static PSM duration and request a second PSM duration of 5 hours, the same as the first PSM duration. App1 and App3 may be configured to determine their respective PSM durations dynamically and request PSM durations of 3 hour and 12 hours, respectively. AP PSM task 708 again determines the minimum of the requested PSM durations and set PSM time T to the determined minimum time, in this example, 3 hours. Alternatively, App2 may be reconfigured by App2 servers during the first wake-up cycle with a different PSM duration, for example as discussed above in step 722 of FIG. 7. In this example, App2 is initially configured with a 5 hour first PSM duration, which is reconfigured as a 2 hour second PSM duration. App2 may then request the second PSM duration of 2 hours in a second wake-up cycle. AP PSM task 708 may then determine the minimum PSM next wake up time T is the 2 hour second PSM duration of App2.

In some cases, applications can be installed at random time instances. Devices may wake up and install one or more applications. When an application is installed, the application may request a PSM duration. For example, App1 may be installed during a first installation period. App1 may, during a first wake-up cycle after the first installation period, request a first PSM duration, in this example, 8 hours. The device may then enter a first PSM power down period for a duration of x hours when the device wakes up and installs App2. App2 may then request a second PSM duration, in this example, 5 hours during a second wake-up cycle after the first wake-up cycle. The second PSM duration, in addition to the x hours, may be less than the first PSM duration and App1 may, during a third wake-up cycle, after the second wake-up cycle, request a third PSM duration of 8−x−5 hours. This third PSM duration may be less than a PSM time threshold and rejected, as discussed above with respect to step 730 in FIG. 7. AP PSM task 708 may then determine the next minimum PSM next wake up time T as the 5 hour PSM duration requested by App2.

Example Power Saving Based on Distributed eMTC Functions

The techniques provided herein may be used to advantage for low power devices (e.g., a wireless node such as a user equipment (UE) 120), such as machine type communication (MTC) devices, enhanced/evolved MTC (eMTC) devices, Internet-of-Things (IoT) devices, and/or narrowband IoT (NB-IoT) devices, that may remain in low power states (e.g., long sleep cycles) much of the time and may wake up only occasionally (e.g., just a few times a day) to send and/or receive data. Such devices may enter a "deep sleep" power saving mode (PSM), during which transceivers of the device are turned off for extended periods of time.

Aspects of the present disclosure provide techniques for improved PSM procedures, for example, to improve power savings based on distributed eMTC functions, for example, between an applications processor and a modem of a low cost device. While the techniques are described with reference to eMTC power saving modes, those skilled in the art will recognize that the techniques may be extended to power saving modes of other devices (e.g., such as MTC, IoT, and/or NB-IoT devices, etc.). MTC and/or eMTC devices may be implemented as IoT (e.g., NB-IoT) devices.

As described above with respect to FIG. 7, in the current PSM procedure (e.g., such as illustrated in FIG. 7), the low cost device may enter the deep-sleep state (e.g., the PSM mode) after all PSM-aware applications indicate their readiness to the PSM task. Since the power consumption for low cost devices is expected to be very minimum (e.g., average over time) in order maximize battery life, it may be desirable to for low cost devices to conserve as much power consumption as possible.

Low cost device may have a multi-processor architecture. The multi-processor architecture may include an applications processor (AP) and a modem processor (MP), for example, such as the multi-processor architecture 600 illustrated in FIG. 6. According to certain aspects described herein, managing power of the individual processors (e.g., the AP and MP) in the multi-processor architecture may allow enhanced power saving procedures in order to reduce power consumption and improve battery life for such low cost devices.

Figure 8:
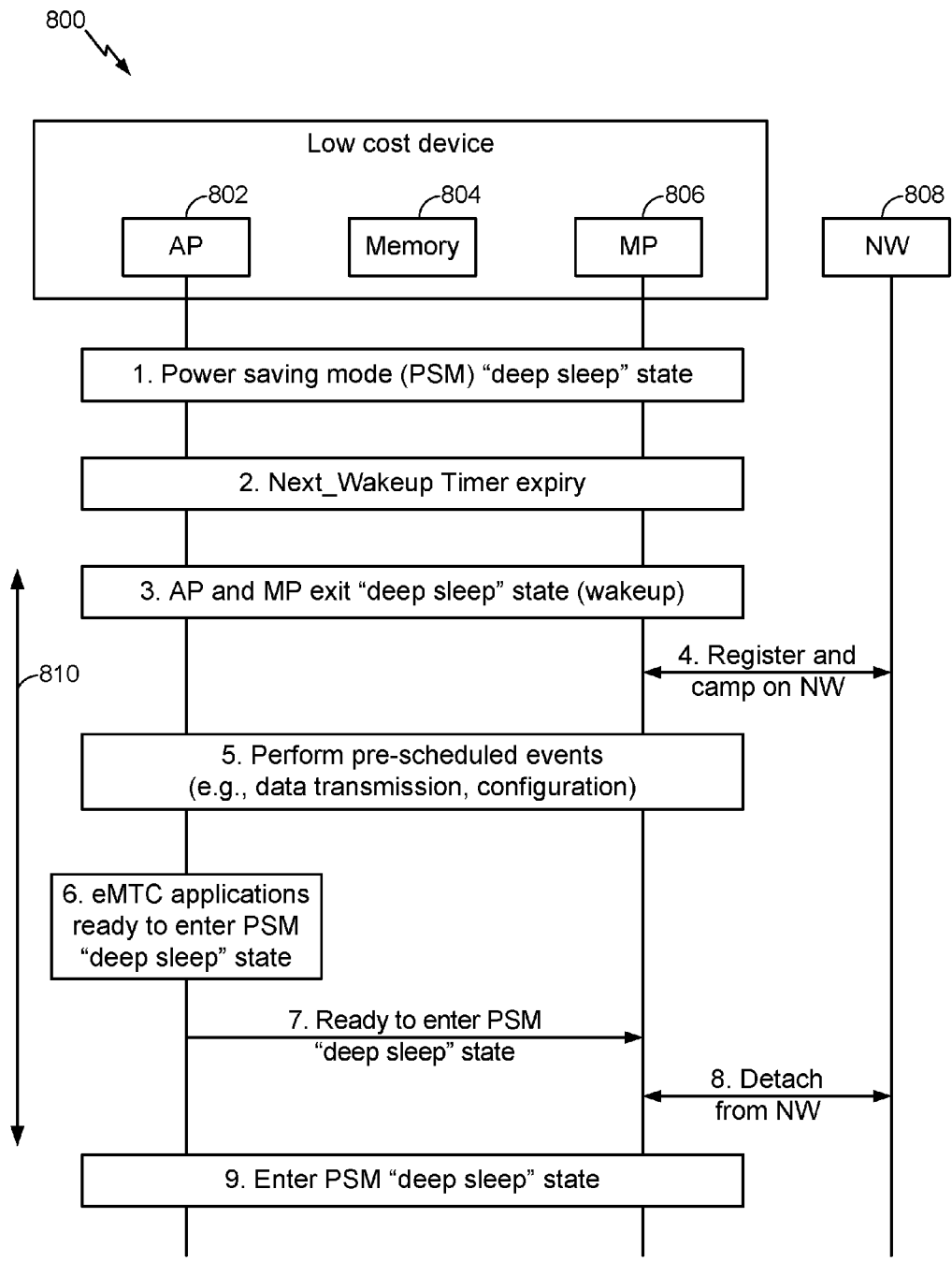
FIG. 8 is a call flow diagram illustrating an example power savings mode procedure.

FIG. 8 is a call flow diagram illustrating an example power savings mode procedure 800 for a low cost device having a multi-processor architecture. As shown in FIG. 8, the low cost device (e.g., an eMTC UE) includes the AP 802 (which may be similar to AP 602 and/or AP 702), a memory 804, and MP 806 (which may be similar to MP 604 and/or MP 710).

As shown in FIG. 8, at 1, the low cost device is in the PSM (e.g., in a deep sleep state). At 2, the next wake-up timer expires and, at 3, the low cost device wakes up from the PSM and AP 802 and MP 806 exit the deep sleep state. As shown in FIG. 8, AP 802 and MP 806 are powered-on at this time, and remain powered power for the duration shown by the arrows 810.

At 4, MP 806 connects (e.g., attempts to connects, scans for, camps on, and/or registers with) to network 808. At 5, the low cost device performs pre-scheduled events, which may include data transmission, configuration, etc. At 6, the eMTC applications may indicate (e.g., to AP PSM task as illustrated in FIG. 7) readiness to enter the PSM deep sleep state. At 7, AP 802 informs MP 806 (e.g., MP PSM Task as illustrated in FIG. 7) that it is ready to enter the PSM deep sleep state. At 8, MP 806 detaches from network 808 and, at 9, the low cost device returns to the PSM and AP 802 and MP 806 enter the deep-sleep state. As shown in FIG. 8, at this time, both AP 802 and MP 806 are powered-down (e.g., power collapsed into the PSM deep sleep state).

As shown in FIG. 8, the power management of the processors (e.g., AP and MP) are closely tied. For example, the applications processor and the modem both are powered-up and powered down at the time same. In the PSM procedure call flow shown in FIG. 8, the wake up and sleep times for the processors are not individually controlled or managed. This may lead inefficient power consumptions, since there may be times when only one of the processors could be active and the other processor could be collapsed.

Accordingly, techniques for enhanced PSM procedures are desirable. Techniques are provided herein for distributed functions of the AP and MP such that the processors may be individually controlled or managed which may result in additional power savings and extended battery life for low cost devices.

Figure 9:
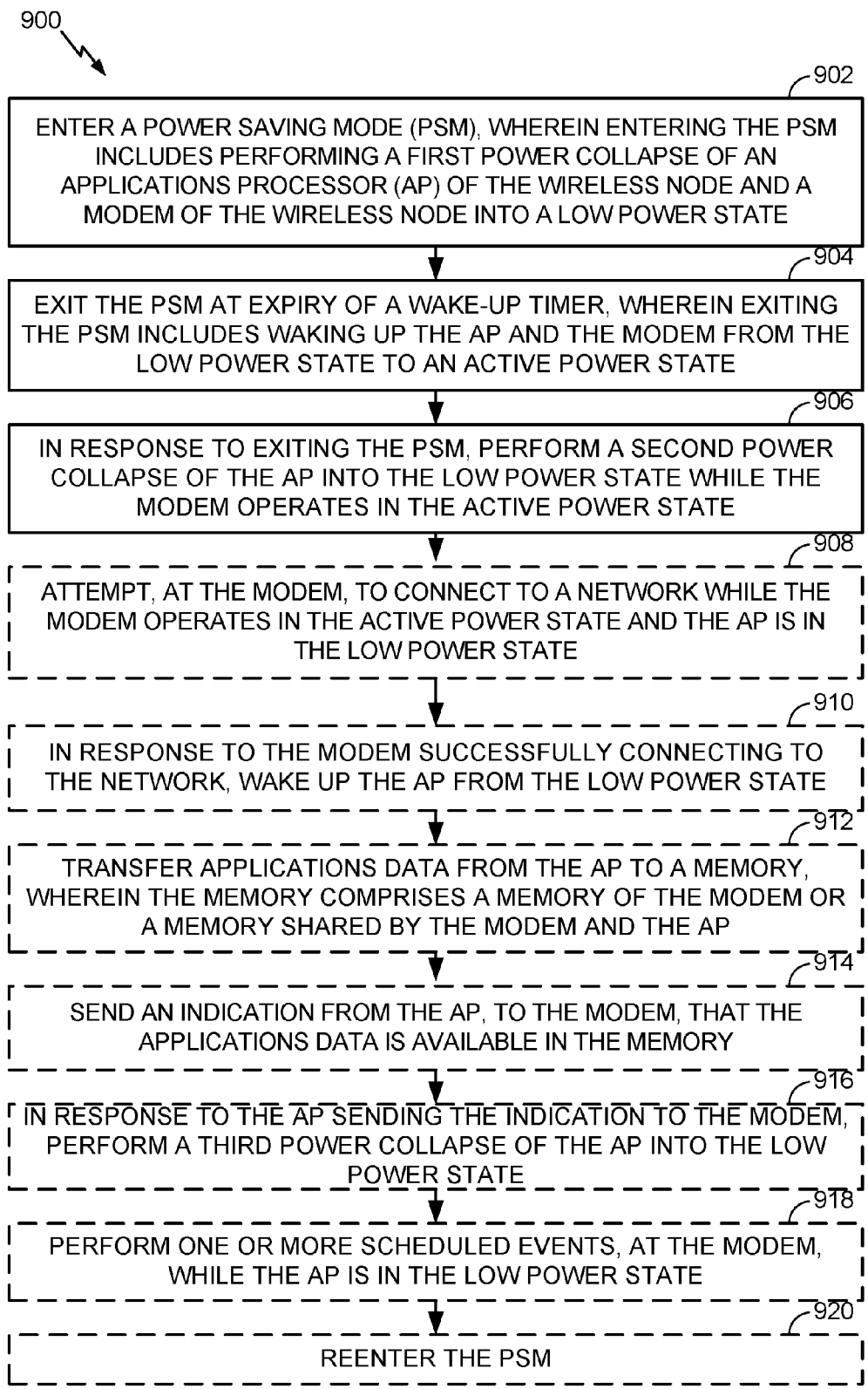
FIG. 9 is a flow diagram illustrating example operations for wireless communications by a wireless node, in accordance with certain aspects of the present disclosure.

FIG. 9 illustrates example operations 900 for an enhanced PSM procedure, in accordance with certain aspects of the present disclosure. The operations 900 can be performed by a wireless node, such as a low cost device (e.g., an eMTC UE), which may be one of the UEs 120 illustrated in, e.g., FIG. 1. The operations 900 may begin, at 902, by entering a PSM, wherein entering the PSM includes performing a first power collapse of an applications processor of the wireless node and a modem of the wireless node into a low power state. At 904, the wireless node exits the PSM at expiry of a wake-up timer, wherein exiting the PSM includes waking up the applications processor and the modem from the low power state to an active power state. At 906, in response to exiting the PSM, the wireless node performs a second power collapse of the applications processor into the low power state while the modem operates in the active power state.

For example, at 908, the modem may attempt to connect to a network while the applications processor is in the low power state. The modem may obtain (e.g., over-the-air (OTA)) an indication of an eMTC application type and information related to the eMTC application type (e.g., a number of failed attempts and/or a duration for attempting).

At 910, the wireless node may wake up the applications processor from the low power state (e.g., by a message sent from the modem to the applications processor) upon establishment or availability of radio connectivity at the modem. At 912, the applications processor may transfer application data from the applications processor to a memory (e.g., a memory of the modem or a memory shared by the modem and the applications processor) and, at 914, send a message to the modem informing the modem that application data is available in the memory. At 916, after informing the modem of the available data, the applications processor may immediately enter deep sleep state or may receive a message from the modem indicating for the applications processor to enter the deep sleep state. The modem may remain awake and, at 918, may perform pre-scheduled events. In some cases, performing the pre-scheduled events may include transmitting the data available in the memory. At 920, after completion of the scheduled events, the wireless node may reenter the PSM.

Figure 10:
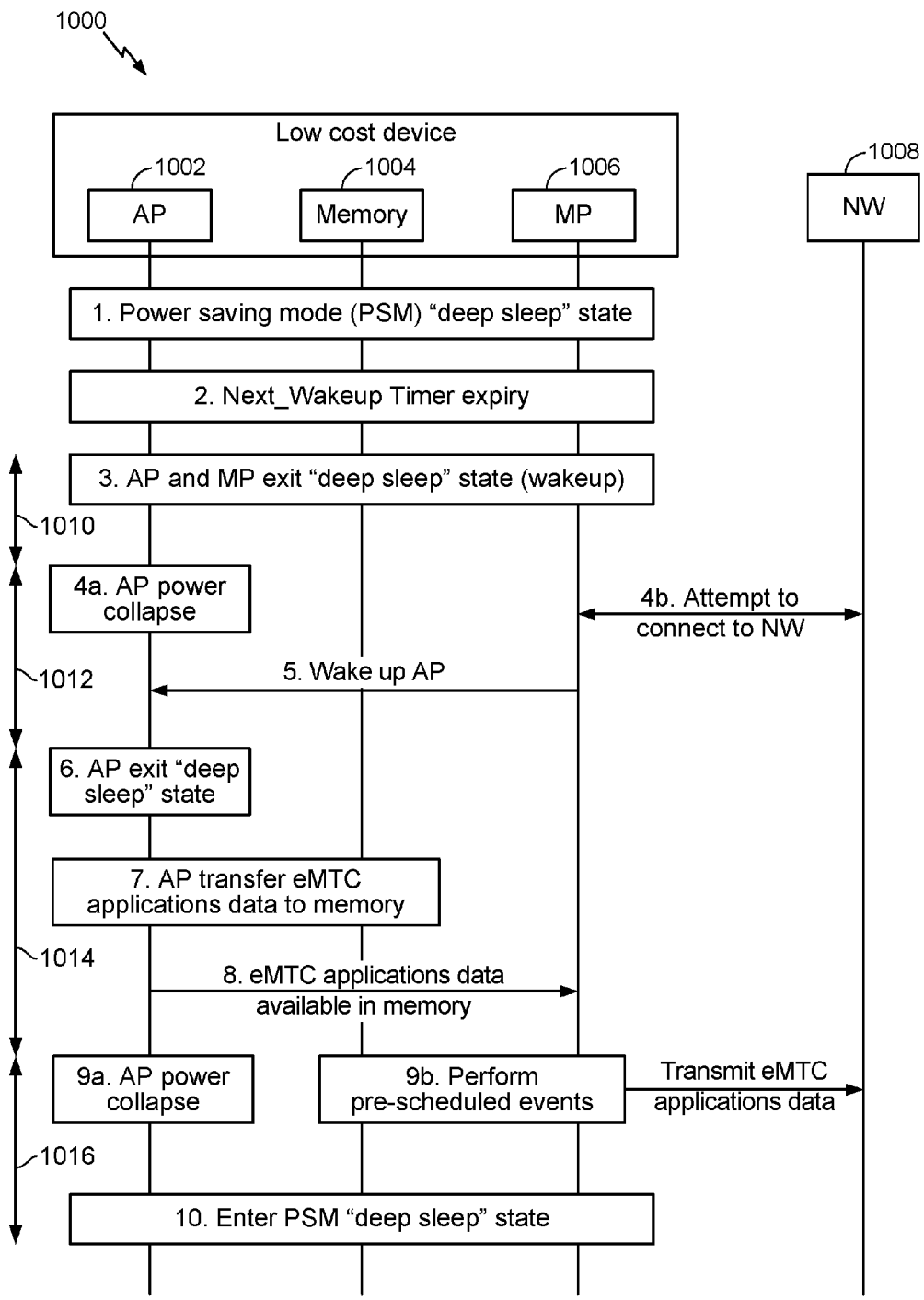
FIG. 10 is a call flow diagram illustrating an example power savings mode procedure, in accordance with certain aspects of the present disclosure.

FIG. 10 is a call flow diagram illustrating an example power savings mode procedure 1000, in accordance with certain aspects of the present disclosure. As shown in FIG. 10, the low cost device includes AP 1002, memory 1004, and MP 1006. The low cost device may be one of the wireless does 120 illustrated in FIG. 1 and may be, for example, an eMTC UE, NB-IoT device, etc. AP 1002 may be similar to AP 602 illustrated in FIG. 6. Memory 1004 may be a memory of MP 1006 or may be a shared memory between AP 1002 and MP 1006. MP 1006 may be similar to MP 604 illustrated in FIG. 6.

According to certain aspects, eMTC functions of the low cost device may be divided in a distributed manner between the processors. For example, AP 1002 may be responsible for generating eMTC data and MP 1006 may be responsible for connecting to the network 1008 and communicating with the network 1008 (e.g., including transmitting the generated eMTC data). The distribution of the eMTC functions may allow AP 1002 and MP 1006 to be only loosely coupled during the PSM procedure. For example, during the PSM procedure, AP 1002 may dynamically enter PSM deep-sleep state to save power, while the modem remains active.

Similar to the PSM procedure illustrated in FIG. 8, at 1 the low cost device may be in a PSM deep sleep state. At 2, the next wakeup timer may expire and, at 3, the low cost device may wake up and AP 1002 and MP 1006 may exit the deep sleep state and be powered on. According to certain aspects, during the PSM procedure 1000, AP 1002 may be dynamically sent to and/or woken up from the deep sleep state.

As shown in FIG. 10, after the low cost device exits the PSM deep sleep (at 3), AP 1002 may be power collapsed, at 4*a*, and enter the PSM deep sleep state. AP 1002 may remain in the PSM deep sleep state (e.g., a low power state) for the duration 1012. MP 1006 may remain awake (e.g., in an active power state). For example, AP 1002 may enter the PSM deep sleep state while MP 1006 attempts to connect to network 1008, at 4*b*. During this duration, MP 1006 may scan for, camp on, register with, and/or obtain an IP address from the network. As described in greater detail below, the number of attempts and/or the duration for attempting to connect to the network may be limited.

MP 1006 may successfully connect to network 1008 and may obtain an IP address from network 1008. After connecting, at 5, MP 1006 may wake up AP 1002 from the PSM deep sleep state and, at 6, AP 1002 exits the PSM deep sleep state. Once powered on and in an active power state, AP 1002 may prepare eMTC applications data for MP 1006 to transmit to network 1008. For example, at 7, AP 1002 transfers the eMTC applications data to memory 1004 (e.g., a memory of the modem or a shared memory between AP 1002 and MP 1006). At 8, AP 1002 informs MP 1006 of the eMTC applications data available in memory 1004. After transferring the data and informing the modem, AP 1002 may be power collapsed and return to the PSM deep sleep state, at 9*a*. In some cases, the AP 1002 may immediately (e.g., autonomously) enter the PSM deep sleep state after transferring the data and informing the modem. Alternatively, AP 1002 may receive an indication from MP 1006 to re-enter the PSM deep sleep state. AP 1002 may remain in this PSM deep sleep state for the duration 1016.

While AP 1002 is in the PSM deep sleep state (entered into a 9*a*), MP 1006 may remain awake. For example, during this time, MP 1006 may perform pre-scheduled events, at 9*b*. The pre-scheduled events may include transmitting the eMTC applications data, available in memory 1004, to network 1008. Upon completion of transmitting the available eMTC applications data and performing any pre-scheduled events, the low cost device may return to the PSM deep sleep state, at 10. Although not shown in FIG. 10, this may include MP 1006 waking up AP 1002 to prepare for entering the PSM deep sleep state, and may also include MP 1006 detaching from network 1008.

As shown in FIG. 10, rather than both the applications processor and modem remaining awake during the entire PSM procedure. AP 1002 can be power collapsed and sent to the PSM deep sleep state during the periods 1012 and 1016, and only is awake during the periods 1010 and 1014. Thus, the low cost device may achieve power savings, e.g., during the periods 1012 and 1016.

In some cases, while attempting to connect to a network (e.g., network 1008), for example at 4*b*, MP 1006 may have difficulty finding an available system to connect to. For example, the low cost device may be out-of-service (OOS) and/or backoff procedures may be performed. According to certain aspects, AP 1002 (e.g., PSM module/PSM task of AP 1002) may provide an indication to MP 1006 (e.g., to the PSM module/PSM task of MP 1006) of a number of attempts and/or a duration of the attempts before giving up attempting to connect to the network. The number and/or duration of attempts indicated may be based on eMTC type of the low cost device and/or of the eMTC applications. The eMTC application type and the information related to the eMTC application type (e.g., number of attempts and duration) may be configured at the manufacturing of the low cost device or may be signaled to the low cost device over the air (OTA).

Although not shown in FIG. 10, according to certain aspects, MP 1006 may provide information to AP 1002, such as radio connectivity related information (e.g., cell information), network information, radio condition information, modem/radio capability information, memory size information, etc. The information may be specifically filtered by MP 1006 and presented to AP 1002 (e.g., to the PSM module/PSM task of AP 1002). The PSM module/PSM task in AP 1002 may further abstract and present the information to the eMTC applications.

Although not shown in FIG. 10, according to certain aspects, AP 1002 may be woken up from the PSM deep sleep state based on data received by the low cost device, for example, from network 1008. For example, the low cost device may be receiving short message service (SMS) messages (e.g., for "Device Triggering", "Device Provisioning" or "Small Data Transmission"). When an SMS is received, AP 1002 may exit the PSM deep sleep (e.g., MP 1006 may wake up AP 1002). After exiting the PSM deep sleep state, AP 1002 may transfer data to memory 1004 and return to the PSM deep sleep state. The SMS messages may be received, for example, via a circuit-switched (CS) domain, or may be received via a packet-switched (PS) domain if the low cost device does not support CS.

As used herein, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. Generally, where there are operations illustrated in Figures, those operations may be performed by any suitable corresponding counterpart means-plus-function components.

For example, means receiving and/or means for obtaining may include a receiver, such as receive processor 238, MIMO detector 236, demodulator(s) 232a-232t, and/or antenna(s) 234a-234t of the base station 110 illustrated in FIG. 2 and/or MIMO detector 256, receive processor 258, demodulator(s) 254a-254r, and/or antenna(s) 252a-252r of the user equipment 120 illustrated in FIG. 2. Means for determining, means for performing, means for transferring, means for sending, means for entering, means for waking up, means for exiting, means for receiving, means for obtaining, and/or means for attempting, may include one or more processors (or a processing system), such as controller/processor 240, scheduler 246, transmitter processor 220, receive processor 238, MIMO detector 236, TX MIMO processor 230, and/or modulator(s)/demodulator(s) 232a-232t of the base station 110 illustrates in FIG. 2, and/or controller/processor 280, receive processor 258, transmit processor 264, MIMO detector 256, TX MIMO processor 266, and/or modulator(s)/demodulator(s) 254a-254r of the user equipment 120 illustrated in FIG. 2. Means for means for transmitting, may include a transmitter, such as transmit processor 220, TX MIMO processor 230, modulator(s) 232a-232t, and/or antenna(s) 234a-234t of the base station 110 illustrated in FIG. 2, and/or transmit processor 264, TX MIMO processor 266, modulator(s) 254a-254r, and/or antenna(s) 252a-252r of the user equipment 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a wireless node, comprising:
    entering a power saving mode (PSM), wherein entering the PSM includes performing a first power collapse of an applications processor of the wireless node and a modem of the wireless node into a low power state;
    exiting the PSM at expiry of a wake-up timer, wherein exiting the PSM includes waking up the applications processor and the modem from the low power state to an active power state; and
    in response to exiting the PSM, performing a second power collapse of the applications processor into the low power state while the modem operates in the active power state.

2. The method of claim 1, wherein the low power state comprises a deep sleep state.

3. The method of claim 1, wherein the wireless node comprises an enhanced machine type communications (eMTC) device.

4. The method of claim 1, further comprising:
    attempting, at the modem, to connect to a network while the modem operates in the active power state and the applications processor is in the low power state.

5. The method of claim 4, further comprising:
    obtaining, at the modem, an indication of application types and information related to the application types, wherein the information related to the application types comprises at least one of: a number of failed attempts or a duration for attempting to connect to the network associated with the application types.

6. The method of claim 5, wherein the obtaining is via a configuration at manufacturing time of the wireless node or receiving over-the-air (OTA).

7. The method of claim 4, further comprising:
    receiving from the modem, at the applications processor, information regarding at least one of: cell information, network information, radio frequency conditions, modem capability information, or information regarding a size of a memory.

8. The method of claim 4, further comprising:
    in response to the modem successfully connecting to the network, waking up the applications processor from the low power state.

9. The method of claim 8, further comprising:
    transferring applications data from the applications processor to a memory, wherein the memory comprises a memory of the modem or a memory shared by the modem and the applications processor.

10. The method of claim 9, further comprising:
    sending an indication from the applications processor, to the modem, that the applications data is available in the memory.

11. The method of claim 9, further comprising:
    in response to the applications processor sending the indication to the modem, performing a third power collapse of the applications processor into the low power state.

12. The method of claim 11, further comprising:
    performing one or more scheduled events, at the modem, while the applications processor is in the low power state.

13. The method of claim 12, wherein performing the one or more scheduled events includes transmitting the applications data available in the memory to the network.

14. The method of claim 12, further comprising:
    after the modem performs the one or more scheduled events, preparing the wireless node for reenter the PSM, wherein the preparing comprises at least one of: performing a detach procedure with the network or storing context data related to at least one of: applications or connectivity; and reentering the PSM after the preparing.

15. The method of claim 4, further comprising:
receiving applications data from the network; and
in response to receiving the applications data from the network, waking up the applications processor to process the applications data.

16. An apparatus for wireless communications, comprising:
means for entering a power saving mode (PSM), wherein entering the PSM includes performing a first power collapse of an applications processor of the apparatus and a modem of the apparatus into a low power state;
means for exiting the PSM at expiry of a wake-up timer, wherein exiting the PSM includes waking up the applications processor and the modem from the low power state to an active power state; and
means for, in response to exiting the PSM, performing a second power collapse of the applications processor into the low power state while the modem operates in the active power state.

17. The apparatus of claim 16, wherein the low power state comprises a deep sleep state.

18. The apparatus of claim 16, wherein the apparatus comprises an enhanced machine type communications (eMTC) device.

19. The apparatus of claim 16, further comprising:
means for attempting, at the modem, to connect to a network while the modem operates in the active power state and the applications processor is in the low power state.

20. The apparatus of claim 19, further comprising:
means for obtaining, at the modem, an indication of application types and information related to the application types, wherein the information related to the application types comprises at least one of: a number of failed attempts or a duration for attempting to connect to the network associated with the application types.

21. The apparatus of claim 19, further comprising:
means for, in response to the modem successfully connecting to the network, waking up the applications processor from the low power state.

22. The apparatus of claim 21, further comprising:
means for transferring applications data from the applications processor to a memory, wherein the memory comprises a memory of the modem or a memory shared by the modem and the applications processor.

23. The apparatus of claim 22, further comprising:
means for sending an indication from the applications processor, to the modem, that the applications data is available in the memory.

24. The apparatus of claim 22, further comprising:
means for, in response to the applications processor sending the indication to the modem, performing a third power collapse of the applications processor into the low power state.

25. The apparatus of claim 24, further comprising:
means for performing one or more scheduled events, at the modem, while the applications processor is in the low power state.

26. The apparatus of claim 25, wherein means for performing the one or more scheduled events includes means for transmitting the applications data available in the memory to the network.

27. The apparatus of claim 25, further comprising:
means for, after the modem performs the one or more scheduled events, preparing the wireless node for reentering the PSM, wherein means for preparing comprises at least one of: means for performing a detach procedure with the network or means for storing context data related to at least one of: applications or connectivity;
means for reentering the PSM after the preparing.

28. The apparatus of claim 19, further comprising:
means for receiving applications data from the network; and
means for, in response to receiving the applications data from the network, waking up the applications processor to process the applications data.

29. An apparatus for wireless communications, comprising:
at least one processor configured to:
enter a power saving mode (PSM), wherein entering the PSM includes performing a first power collapse of an applications processor of the apparatus and a modem of the apparatus into a low power state;
exit the PSM at expiry of a wake-up timer, wherein exiting the PSM includes waking up the applications processor and the modem from the low power state to an active power state; and
in response to exiting the PSM, perform a second power collapse of the applications processor into the low power state while the modem operates in the active power state; and
a memory coupled to the at least one processor.

30. A non-transitory computer readable medium having computer executable code stored thereon for wireless communications by a wireless node, the code comprising:
code for entering a power saving mode (PSM), wherein entering the PSM includes performing a first power collapse of an applications processor of the wireless node and a modem of the wireless node into a low power state;
code for exiting the PSM at expiry of a wake-up timer, wherein exiting the PSM includes waking up the applications processor and the modem from the low power state to an active power state; and
code for, in response to exiting the PSM, performing a second power collapse of the applications processor into the low power state while the modem operates in the active power state.

* * * * *